(12) United States Patent
Lindberg Baccarin Arnaut et al.

(10) Patent No.: US 11,086,908 B2
(45) Date of Patent: Aug. 10, 2021

(54) ONTOLOGY FOR WORKING WITH CONTAINER IMAGES

(71) Applicant: International Business Machines Corporation, Armonk, NY (US)

(72) Inventors: Wagner Lindberg Baccarin Arnaut, Brasilia (BR); Zalkind Lincoln Dantas Rocha, Brasilia (BR)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 16/195,933

(22) Filed: Nov. 20, 2018

(65) Prior Publication Data

US 2020/0159747 A1 May 21, 2020

(51) Int. Cl.
| | |
|---|---|
| *G06F 16/28* | (2019.01) |
| *G06F 7/14* | (2006.01) |
| *G06F 16/245* | (2019.01) |
| *G06F 16/22* | (2019.01) |

(52) U.S. Cl.
CPC .......... *G06F 16/285* (2019.01); *G06F 7/14* (2013.01); *G06F 16/2228* (2019.01); *G06F 16/245* (2019.01)

(58) Field of Classification Search
CPC .. G06F 16/285; G06F 16/2228; G06F 16/245; G06F 7/14
USPC ...................................................... 707/740
See application file for complete search history.

(56) References Cited

U.S. PATENT DOCUMENTS

| | | | |
|---|---|---|---|
| 9,280,335 B2 | 3/2016 | Adi | |
| 9,355,248 B1 | 5/2016 | Wiest | |
| 9,367,305 B1 | 6/2016 | Kumar | |
| 2005/0267731 A1* | 12/2005 | Hatcherson | G06F 9/54 703/26 |
| 2011/0138050 A1 | 6/2011 | Dawson | |
| 2014/0122435 A1 | 5/2014 | Chavda | |
| 2015/0067581 A1 | 3/2015 | Wu | |
| 2015/0381557 A1* | 12/2015 | Fan | H04L 61/303 709/245 |
| 2016/0162320 A1 | 6/2016 | Singh | |
| 2016/0170721 A1* | 6/2016 | Heiss | G06F 8/34 717/107 |
| 2017/0180346 A1 | 6/2017 | Suarez | |
| 2017/0199770 A1* | 7/2017 | Peteva | G06F 9/5088 |
| 2018/0032355 A1* | 2/2018 | Haupt | G06F 9/449 |

(Continued)

FOREIGN PATENT DOCUMENTS

WO 2015171030 A1 11/2015

OTHER PUBLICATIONS

"Ontology (information science)", Wikipedia, This page was last edited on Nov. 2, 2018, at 07:29 (UTC), <https://en.wikipedia.org/wiki/Ontology_(information_science)>, 18 pages.

(Continued)

*Primary Examiner* — Kuen S Lu

(74) *Attorney, Agent, or Firm* — David B. Woycechowsky

(57) ABSTRACT

Computer technology for the provision and use of a computer code based ontology to index a repository of container images (for example, Docker container images). The ontology can then be used as an indexing mechanism to search the repository to find the best container image to use for a given set of needs and/or specifications.

14 Claims, 12 Drawing Sheets

(56) References Cited

U.S. PATENT DOCUMENTS

2020/0012818 A1    1/2020   Levin
2020/0110830 A1    4/2020   Chen

OTHER PUBLICATIONS

"Racer", provided in Main Idea of disclosure dated Jun. 29, 2016, downloaded from the Internet on Sep. 10, 2018, 2 pages, <http://www.sts.tu-harburg.de/~r.f.moeller/racer/>.

Androcec, et al., "Cloud Computing Ontologies: A Systematic Review", MOPAS 2012 : The Third International Conference on Models and Ontology-based Design of Protocols, Architectures and Services, Copyright (©) IARIA, 2012. ISBN: 978-1-61208-196-0, 6 pages.

Costache et al., "Software-Defined Networking of Linux Containers", 2014 RoEduNet Conference 13th Edition: Networking in Education and Research Joint Event RENAM 8th Conference, Nov. 13, 2014, 5 pages, Chisinau, Moldova, DOI: 10.1109/RoEduNet-RENAM.2014.6955310.

Deng et al., "Introducing Semantics to Cloud Services Catalogs", 2011 IEEE International Conference on Services Computing, © 2011 IEEE, DOI 10.1109/SCC.2011.69, 8 pages.

Han et al., "An Ontology-enhanced Cloud Service Discovery System", Proceedings of the International MultiConference of Engineers and Computer Scientists 2010 vol. I, IMECS 2010, Mar. 17-19, 2010, Hong Kong, 6 pages.

Huo et al., "Smart Container: an ontology towards conceptualizing Docker", Published 2015 in International Semantic Web Conference, 4 pages.

Martino et al., "Semantic Representation of Cloud Services: a Case Study for Microsoft Windows Azure", 2014 International Conference on Intelligent Networking and Collaborative Systems, © 2014 IEEE, DOI 10.1109/INCoS.2014.76, 6 pages.

Moreews et al., "BioShaDock: a community driven bioinformatics shared Docker-based tools registry", Software Tool Article, F1000Research 2015, 4:1443 Last updated: Sep. 13, 2017, 10 pages.

Pahl, Claus, "Containerization and the PaaS Cloud", IEEE Cloud Computing Published by the IEEE Computer Society, © 2015 IEEE, May/Jun. 2015, pp. 24-31.

Youseff et al., "Toward a Unified Ontology of Cloud Computing", 2008 Grid Computing Environments Workshop, Nov. 12-16, 2008, Print ISBN: 978-1-4244-2860-1, 10 pages, DOI: 10.1109/GCE.2008.4738443, Austin, TX, USA.

* cited by examiner

| | |
|---|---|
| Axiom Description | (A1) All Business Process are Composed By at least one Docker Container |
| OWL Expression | `<owl:Class rdf:about="#BusinessProcess">`<br>  `<rdfs:subClassOf>`<br>    `<owl:Restriction>`<br>      `<owl:onProperty>`<br>        `<owl:ObjectProperty rdf:ID="composedBy_directly"/>`<br>      `</owl:onProperty>`<br>      `<owl:someValuesFrom>`<br>        `<owl:Class rdf:about="#DockerImage"/>`<br>      `</owl:someValuesFrom>`<br>    `</owl:Restriction>`<br>  `</rdfs:subClassOf>`<br>`</owl:Class>`<br>`<owl:ObjectProperty rdf:ID="composesProcess_directly">`<br>  `<rdfs:domain rdf:resource="#DockerImage"/>`<br>  `<owl:inverseOf>`<br>    `<owl:ObjectProperty rdf:about="#composedBy_directly"/>`<br>  `</owl:inverseOf>`<br>  `<rdfs:subPropertyOf>`<br>    `<owl:ObjectProperty rdf:about="#composesProcess"/>`<br>  `</rdfs:subPropertyOf>`<br>`</owl:ObjectProperty>` |
| Concepts | BusinessProcess, DockerImage |
| Relationships | *composedBy_directly* |

FIG. 9

| | |
|---|---|
| Axiom Description | (A2) One DockerImage which its Cloud Service Model of one type cannot be of another type (for example PaaS cannot be of any other Model like IaaS and SaaS). |
| OWL Expression | `<owl:Class rdf:about="#PaaS">`<br>  `<rdfs:subClassOf>`<br>    `<owl:Class rdf:about="#ModelCloudService"/>`<br>  `</rdfs:subClassOf>`<br>  `<owl:disjointWith rdf:resource="#IaaS"/>`<br>  `</owl:disjointWith>`<br>  `<owl:Class rdf:about="#SaaS"/>`<br>  `</owl:disjointWith>`<br>`</owl:Class>` |
| Concepts | DockerImage, IaaS, PaaS, SaaS |
| Relationships | -------------------------- |

FIG. 10

ONTOLOGY FOR WORKING WITH CONTAINER IMAGES

BACKGROUND

The present invention relates generally to the field of container images, and more particularly to working with container images that are stored in a repository of container images.

Cloud computing is seen as one of the main initiatives to provide the agility necessary to information technology departments to support constant changes in business processes. Inside of the domain of cloud computing one technology being used to provide this agility and flexibility is the technology of containers. One known type of containers are Docker Containers. Public Docker Images are published and shared in a public registry called Docker Hub. During deployments of Docker containers, an internal Docker registry and repository is typically defined and structured. Several technologies, such as tags and taxonomies are starting to be used by organizations to provide this capability to search and retrieve container images in the Docker Hub Registry.

Containers are virtual computing environments that include operating-system-level virtualization, also known as "containerization." One currently conventional type of container is the Docker container. When the virtual computing environment of a container is being run, it is herein referred to as a container instantiation. When the virtual computing environment is saved and/or copied as a set of data, that set of data is herein referred to as a container image. A Docker container image is also sometimes herein referred to as a Docker image. Containers are isolated from each other and bundle their own tools, libraries and configuration files; they can communicate with each other through well-defined channels. All containers are run by a single operating system kernel and are thus more lightweight than virtual machines. Container instantiations are created from "images" that specify their precise contents. Images are often created by combining and modifying standard images downloaded from public repositories.

In the technology of computing, an ontology is a data structure that is a representation, formal naming, and definition of the categories, properties, and relations between the concepts, data, and entities that substantiates a set of domain(s). Every field creates ontologies to limit complexity and organize information into data and knowledge. As new ontologies are made, their use can sometimes improve problem solving within the domains of the new ontologies. For example, translating research papers within every field is a problem made easier when experts from different countries maintain a controlled vocabulary of jargon between each of their languages. What ontologies in both information science and philosophy have in common is the attempt to represent entities, ideas, and events, with all their interdependent properties and relations, according to a system of categories. To put it in slightly different words, an ontology is a description (like a formal specification of a program) of the concepts and relationships that can formally exist for an agent or a community of agents. Ontologies can, but do not always, take the form of taxonomic hierarchies of classes, class definitions, and the subsumption relation.

Contemporary ontologies share many structural similarities, regardless of the language in which they are expressed. Most ontologies describe individuals (instances), classes (concepts), attributes, and relations. Common components of ontologies include: (i) individuals, which is to say, instances or objects (the basic or "ground level" objects); (ii) classes, which is to say, sets, collections, concepts, classes in programming, types of objects, or kinds of things; (iii) attributes, which is to say, aspects, properties, features, characteristics, or parameters that objects (and classes) can have; (iv) relations, which is to say, ways in which classes and individuals can be related to one another; (v) function terms, which is to say, complex structures formed from certain relations that can be used in place of an individual term in a statement; (vi) restrictions, which is to say, formally stated descriptions of what must be true in order for some assertion to be accepted as input; (vii) rules, which is to say, statements in the form of an if-then (antecedent-consequent) sentence that describe the logical inferences that can be drawn from an assertion in a particular form; (viii) axioms, which is to say, assertions (including rules) in a logical form that together comprise the overall theory that the ontology describes in its domain of application (note that this definition differs from that of "axioms" as that word is used in generative grammar and formal logic—as used here, "axioms" also include the theory derived from axiomatic statements); and (ix) events, which is to say, the changing of attributes or relations. Ontologies are typically encoded using ontology languages.

The Wikipedia entry for ontology states (as of 5 Nov. 2018) as follows: "Because domain ontologies are written by different people, they represent concepts in very specific and unique ways, and are often incompatible within the same project. As systems that rely on domain ontologies expand, they often need to merge domain ontologies by hand-tuning each entity or using a combination of software merging and hand-tuning. This presents a challenge to the ontology designer. Different ontologies in the same domain arise due to different languages, different intended usage of the ontologies, and different perceptions of the domain (based on cultural background, education, ideology, etc.). At present, merging ontologies that are not developed from a common upper ontology is a largely manual process and therefore time-consuming and expensive. Domain ontologies that use the same upper ontology to provide a set of basic elements with which to specify the meanings of the domain ontology entities can be merged with less effort."

SUMMARY

According to an aspect of the present invention, there is a method, system and/or computer program product for performing the following operations (not necessarily in the following order): (i) receiving a container image ontology (CIO) data set including data indicative of a CIO that provides an organizing construct for a plurality of container images (CIs) stored in a container image repository (CIR), with the CIO including: (a) a plurality of container image classes, (b) a plurality of container image attributes, (c) a plurality of container image relations, and (d) a plurality of container image axioms; (ii) receiving a container image search request; (iii) searching the CIR based upon the search request and the CIO to obtain identities of a set of search-responsive CI(s); and (iv) returning the set of search-responsive CIs.

BRIEF DESCRIPTION OF THE DRAWINGS

FIG. 9 is a first table helpful in explaining various embodiments of the present invention;

FIG. 10 is a second table diagram helpful in explaining various embodiments of the present invention;

DETAILED DESCRIPTION

Figure 1:
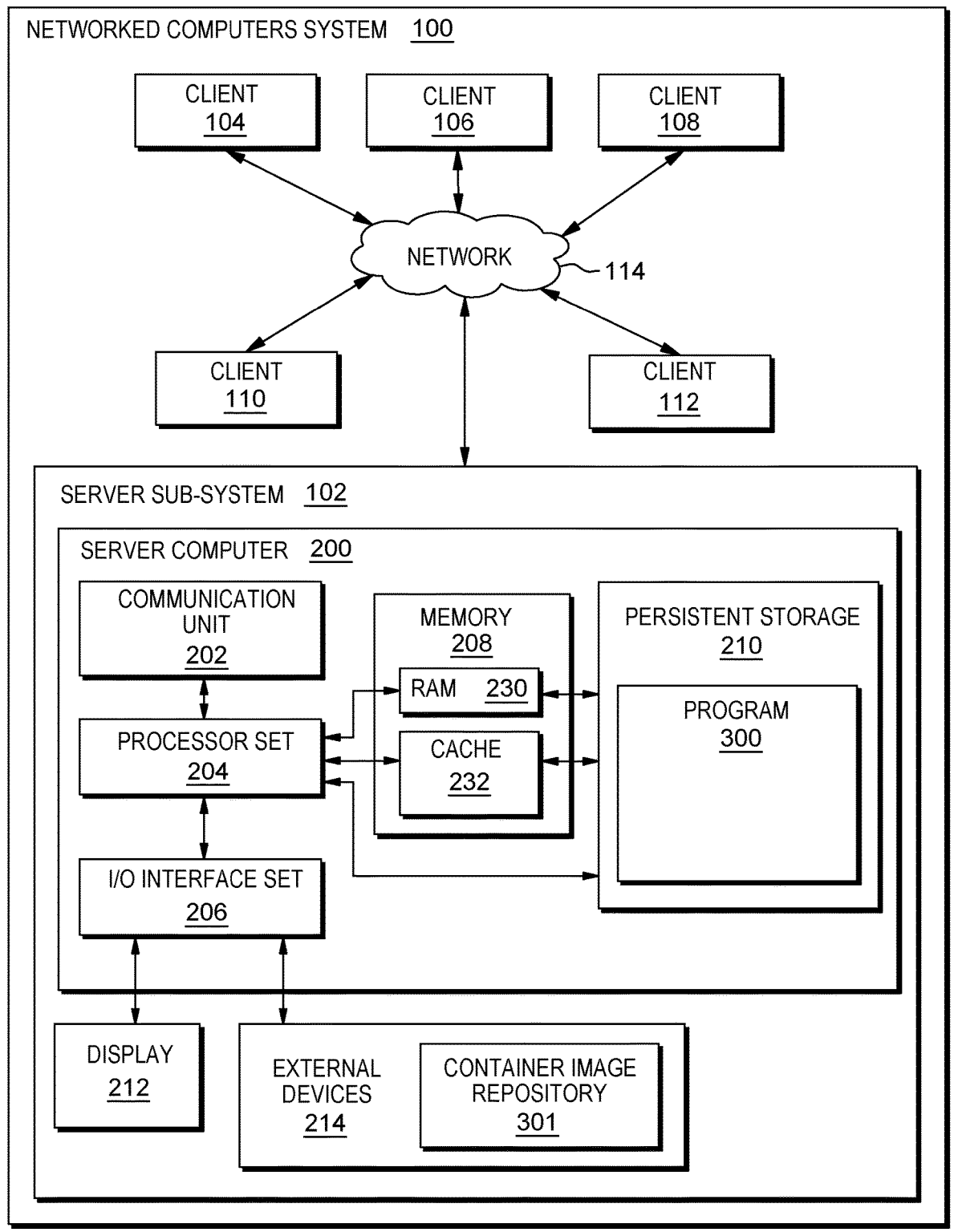
FIG. 1 is a block diagram view of a first embodiment of a system according to the present invention.

Some embodiments of the present invention are directed to the provision and use of an computer code based ontology to index a repository of container images (for example, Docker container images). The ontology can then be used to search the repository to find the best container image to use for a given set of needs and/or specifications. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; program 300; and container image repository 301. The embodiment of FIG. 1 shows container image repository as being stored in external device set 214. Alternatively, this repository may be stored in other ways, such as: (i) in persistent storage 210 (in whole or in part); and/or (ii) in a more distributed manner, with parts of the repository being distributed over other network connected device sets (not shown).

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
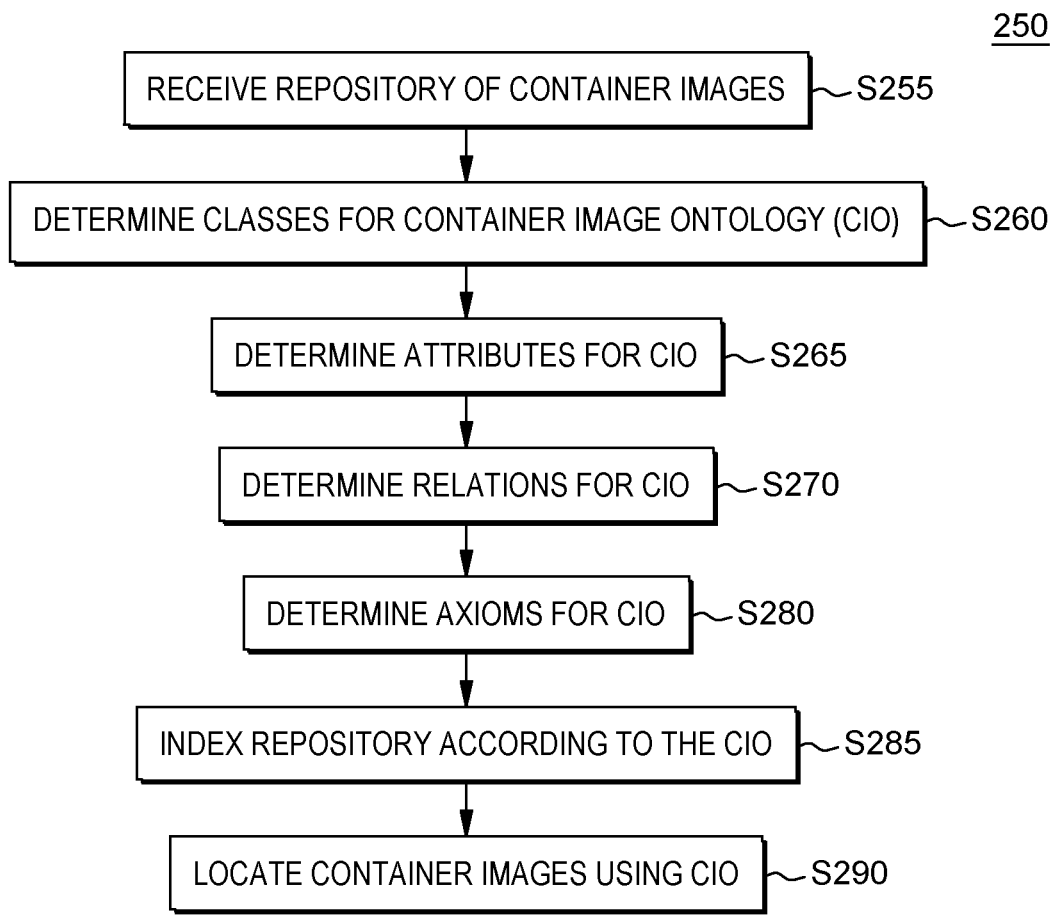
FIG. 2 is a flowchart showing a first embodiment method performed, at least in part, by the first embodiment system.
Figure 3:
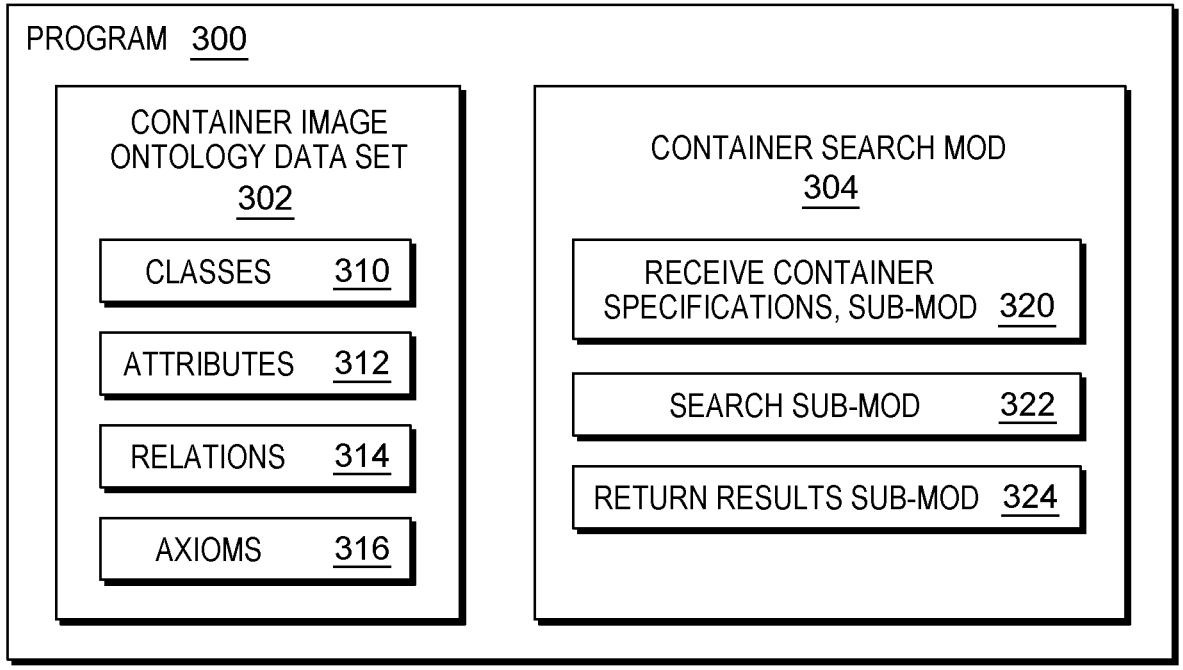
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where container image repository (see FIG. 1) is built up in an external storage sub-system included in external devices 214 of server sub-system 102. The container images stored in container image repository 301 are received from various client sub-systems 104, 106, 108, 110, 112. The following sub-section of this Detailed Description section provides further details on container image repositories.

Processing proceeds to operation S260, where the identities of a set of classes (also herein sometimes referred to as "concepts") is determined for a container image ontology ("CIO") which is to be used as an organizing construct for the container images stored in container image repository 301. These classes are stored at classes block 310 of CIO data set 302. These classes may be determined in one, or more, of the following ways: (i) by human individuals (sometimes herein referred to as "experts"); (ii) by machine logic (for example, an artificial intelligence engine); and/or (iii) by merging the classes in from a pre-existing ontology. The following sub-section of this Detailed Description section provides further details on merging classes in from pre-existing ontologies.

Processing proceeds to operation S265, where the identities of a set of attributes is determined for the CIO. These classes are stored at attributes block 312 of CIO data set 302. These attributes may be determined in one, or more, of the following ways: (i) by experts; (ii) by machine logic (for example, an artificial intelligence engine); and/or (iii) by merging the attributes in from a pre-existing ontology. The following sub-section of this Detailed Description section provides further details on merging attributes in from pre-existing ontologies.

Processing proceeds to operation S270, where the identities of a set of relations is determined for the CIO. These relations are stored at relations block 314 of CIO data set 302. These relations may be determined in one, or more, of the following ways: (i) by experts; (ii) by machine logic (for example, an artificial intelligence engine); and/or (iii) by merging the relations in from a pre-existing ontology. The following sub-section of this Detailed Description section provides further details on merging relations in from pre-existing ontologies.

Processing proceeds to operation S280, where the identities of a set of axioms is determined for the CIO. These axioms are stored at axioms block 316 of CIO data set 302. These axioms may be determined in one, or more, of the following ways: (i) by experts; (ii) by machine logic (for example, an artificial intelligence engine); and/or (iii) by merging the relations in from a pre-existing ontology. The following sub-section of this Detailed Description section provides further details on merging axioms in from pre-existing ontologies.

Before proceeding to a discussion of operation S285, it is noted that the foregoing operations S255, S260, S265, S270 and S280 are not typically performed in order, but rather performed in a temporally overlapping manner, and may continue to be performed as the CIO and repository are used by end users at runtime. It is also noted that the CIO data structure may include additional types of elements, such as non-axiomatic rules.

Processing proceeds to operation S285, where container image repository is indexed (in either or both of CIO data set 302 and/or container image repository 301 (see FIG. 1)) according to the CIO built up in operations S260, S265, S270 and S280.

Figure 4:
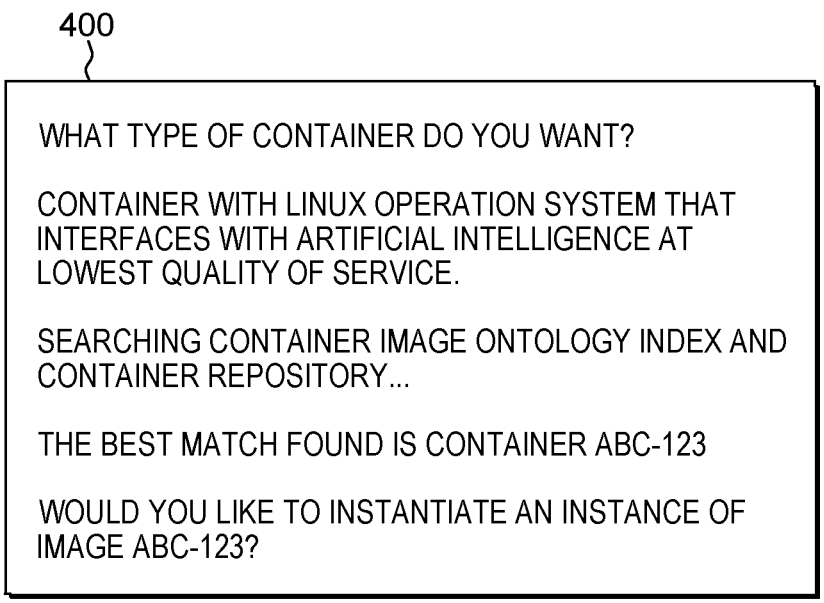
FIG. 4 is a screenshot view generated by the first embodiment system.
Figure 6A:
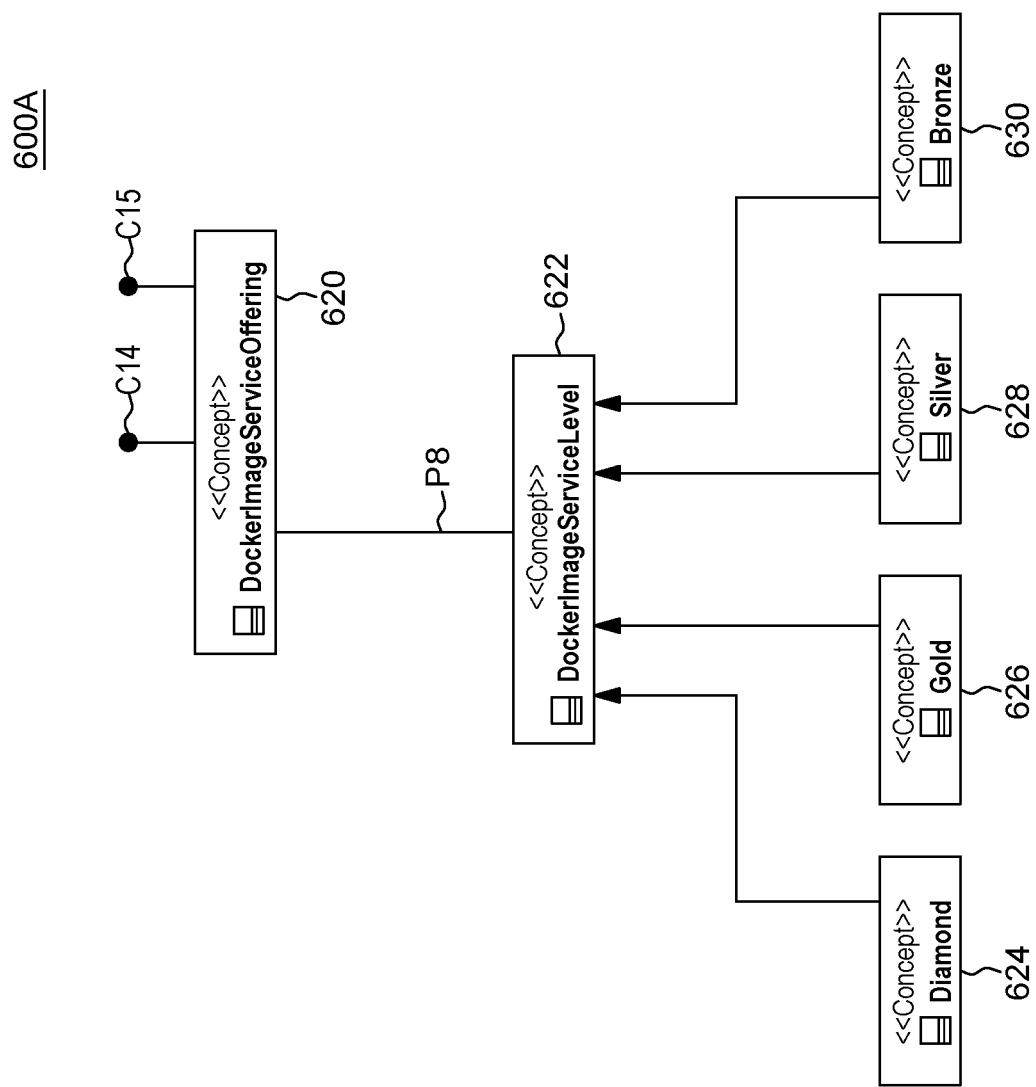
FIGS. 6A, 6B, 6C and 6D collectively make up a block diagram of at least a portion of a container image ontology according to an embodiment of the present invention.

Processing proceeds to operation S290 where the following sub-operations are performed: (i) receive container specifications sub-module 320 of container search module ("mod") 304 receives a set of container needs and/or specification from a user; (ii) search sub-mod 322 uses container image CIO data set 302 to search container image repository 301 for the most appropriate container(s); and (iii) return results sub-mod 324 returns the identity(ies) of the best fitting container image(s) in container image repository 301 to the user. An example of these sub-operations is shown at screenshot 400 of FIG. 4.

III. Further Comments and/or Embodiments

Some embodiments of the present invention recognize the following facts, potential problems and/or potential areas for improvement with respect to the current state of the art: (i) the current tagging and taxonomies for Docker container images have a specific limitation, which is that they do not support inference to provide an optimized search and retrieve of Docker container images in order to support human based search; (ii) current tagging and taxonomy technology does not support inference to provide an optimized search and retrieve of Docker container images in order to support automatic container image discovery and orchestration; (iii) when planning to use Docker containers at enterprise level, there should be a way to store and catalog my enterprise container images that leverages the Docker container images reuse possibilities; (iv) it is desirable avoid Docker container images non-ordered proliferation, where several container images become left running, mislocated and/or forgotten; (v) today there are more than 14.000 Docker container images published at Public Docker Hub; (vi) the large number of pre-existing Docket container images at the Public Docker Hub make it difficult to identify the best container images to address a business problem that may arise; (vii) this foregoing potential issues and challenges take on an enhanced importance when considering the about services oriented architecture type services (SOA) and microservices that are typically running on those Docker container images; and/or (viii) there are several researches mentioning that the best way to search and retrieve Cloud services in Cloud Catalogs, Repositories and Registries is through Ontologies but none of those researches specifically deals with an Ontology for Docker Images on Enterprise Docker Hub Registries.

Some embodiments of the present invention may include one, or more, of the following features, characteristics, operations and/or advantages: (i) a computer-implemented process for ontology for Docker images search; (ii) eliciting a set of ontology requirements using a criteria of a set of predetermined competency questions, to generate a set of ontology elements categorized for inclusion, exclusion and merging; (iii) analyzing an existing set of cloud ontologies using a predetermined set of criteria including gaps, advantages and specifics of those ontologies in the set of cloud ontologies; (iv) merge those ontologies in the set of cloud ontologies with Ontology Web Language for Services using a result of the analyzing and a predetermined ontology merge methodology; (v) mapping concepts related to cloud services to Docker images concepts according to a predetermined criteria; and (vi) defining an ontology for a Docker container images registry and repository at an organizational level of the Docker hub, Docker registries and repositories; (vii) the Docker container, images registry and repository is a Docker hub; and/or (viii) the ontology defined has an inference capability.

Some embodiments of the present invention may include one, or more, of the following features, characteristics, operations and/or advantages: (i) OWL-DOCKER, an Ontology for Docker Images Search, Discovery, Retrieve and Categorization into Docker Hub, Registry, Repositories and Catalogs; (ii) includes the capability to search, retrieve, discovery, categorize and orchestrate Docker Images in Docker Hub Registries inhibiting the uncontrolled proliferation of Docker Containers inside the catalog, registry and repository; and/or (iii) an appropriate way to define container image is most appropriate to the end user based on Cloud objectives when the Enterprise Docker Hub starts to have duplicated container images, or very similar container images.

Some embodiments of the present invention may include one, or more, of the following features, characteristics, operations and/or advantages: (i) covers ontology usage for search, retrieve, discovery, categorization and orchestration of Docker containers; (ii) provides ontology usage with Docker Hub Registry to facilitate search, discovery, retrieve and categorization of Enterprise Level Docker Registry; (iii) an ontology for Enterprise level Docker Registry and Repositories, and Docker Hub for Docker images search, discovery, retrieve, categorization and orchestration; (iv) deals with Docker images reuse; (v) covers an ontology to be used at PaaS (Platform as a Service), CaaS (container as a service) or SaaS (Software as a Service) Cloud Models; and/or (vi) specialized for container images usage.

Some embodiments of the present invention may include one, or more, of the following features, characteristics, operations and/or advantages: (i) provides a Docker Containers ontology to be used in Docker Hub Registry and Repositories to provide container images search, discovery, retrieve, categorization and orchestration; (ii) provides a definition of an ontology for Docker Container Images Registry and Repository (for example, Docker Hub); (iii) is built using OWL; (iv) an ontology that uses current existing Cloud concepts and ontologies and merges these with OWL-S(Ontology Web Language for Services); (v) provides an ontology is tailored and specialized for container repositories, registries and catalogs using Docker; (vi) covers specifics of container images, Docker hub and container repositories; and/or (vii) during the ontology merge process there are some concepts that are inherited from Cloud Ontologies and/or Smart Container Ontology.

Figure 5:
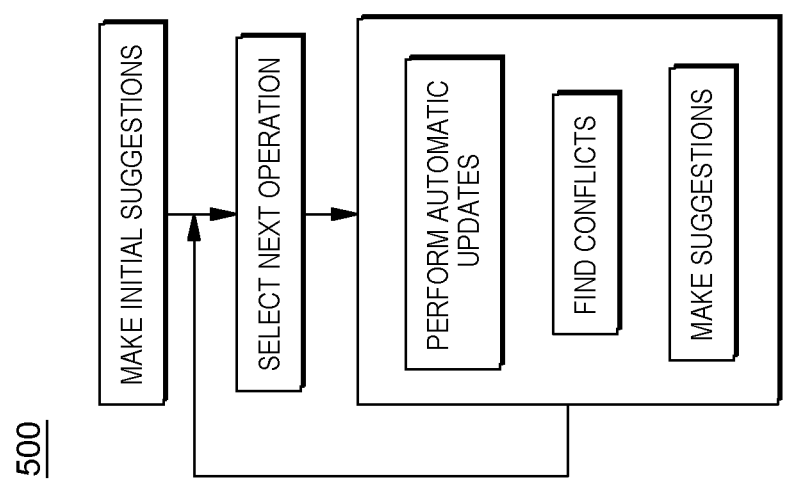
FIG. 5 is a block diagram helpful in explaining various embodiments of the present invention.
Figure 6B:
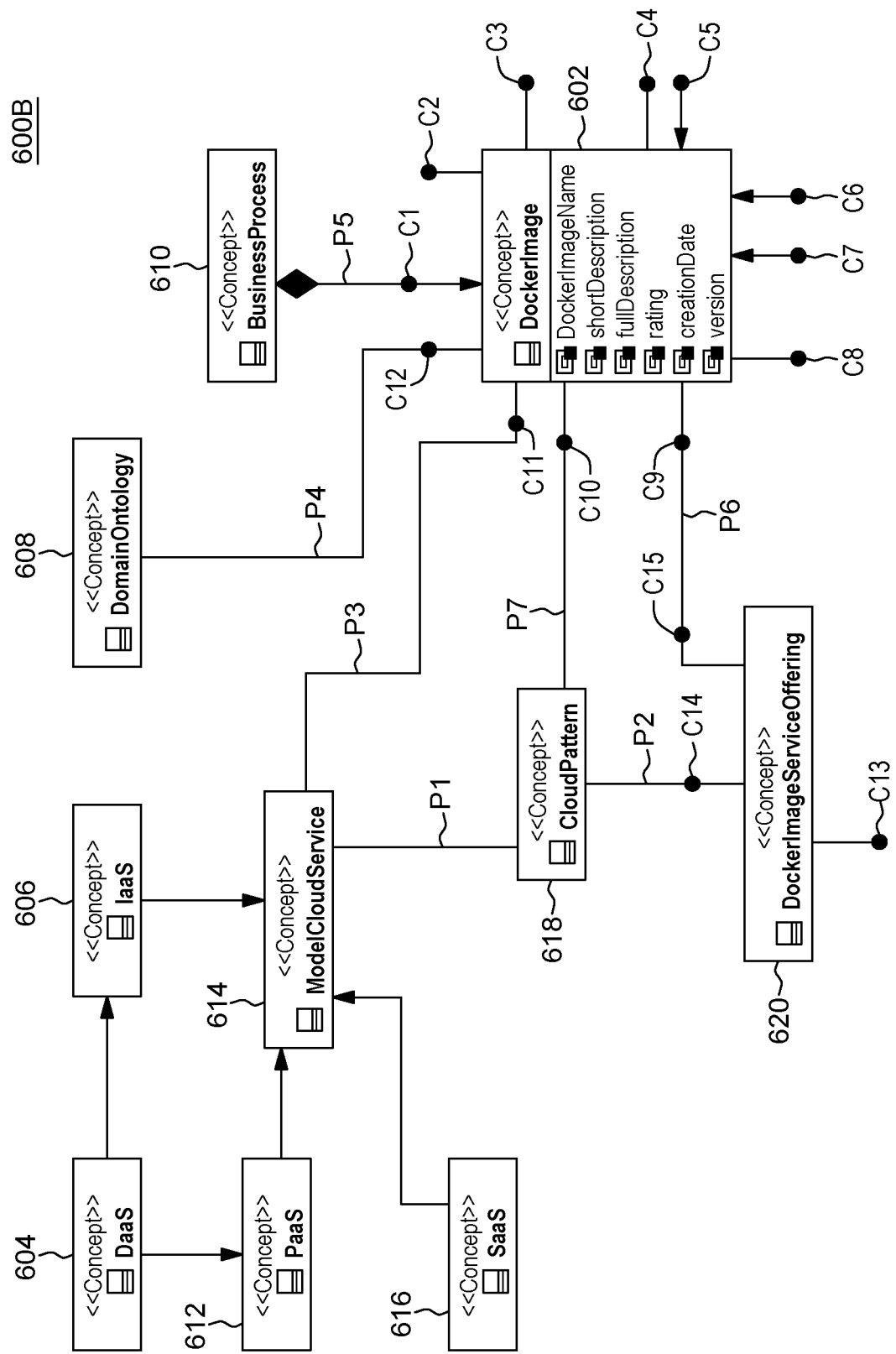
Figure 6C:
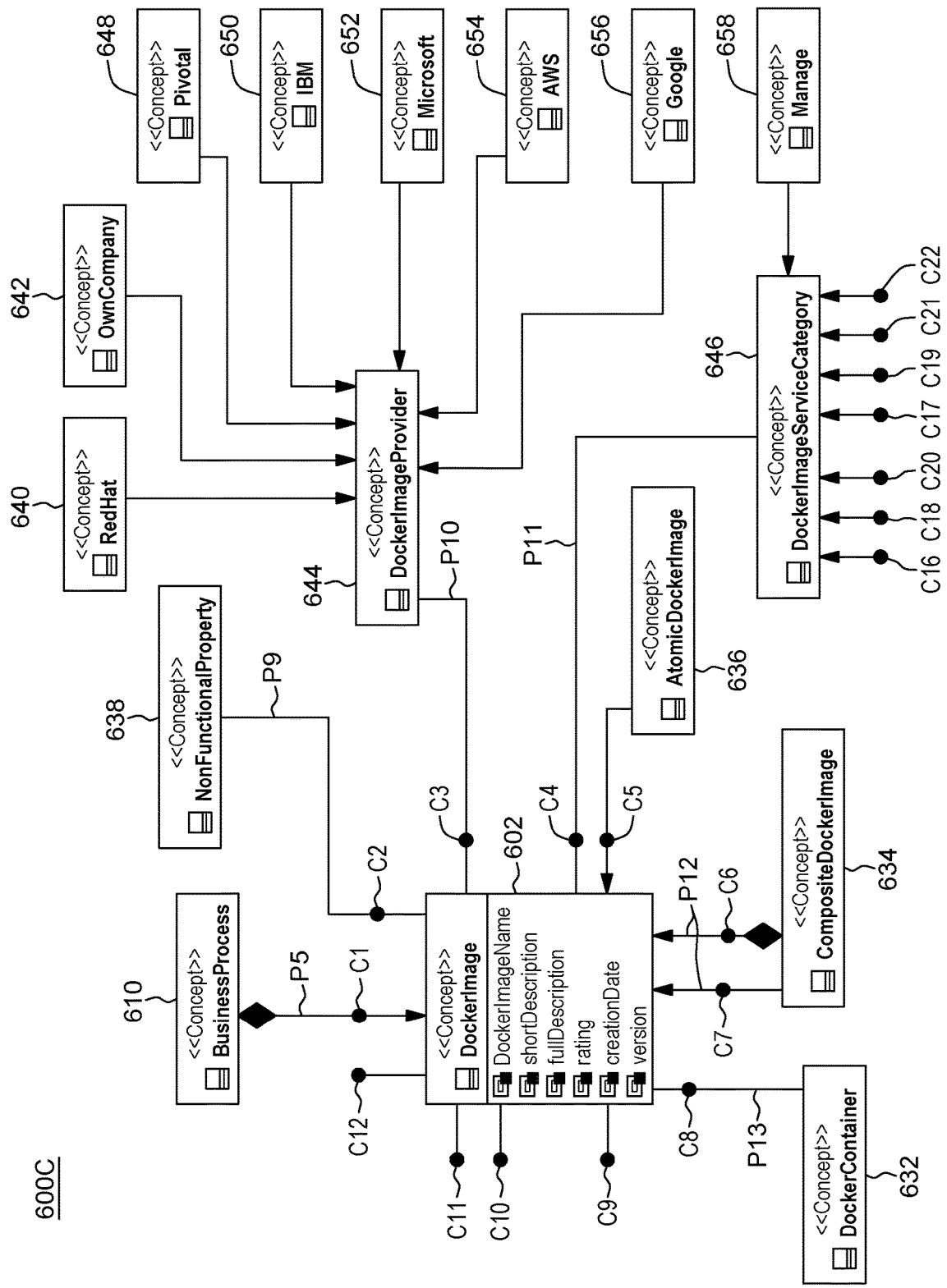
Figure 6D:
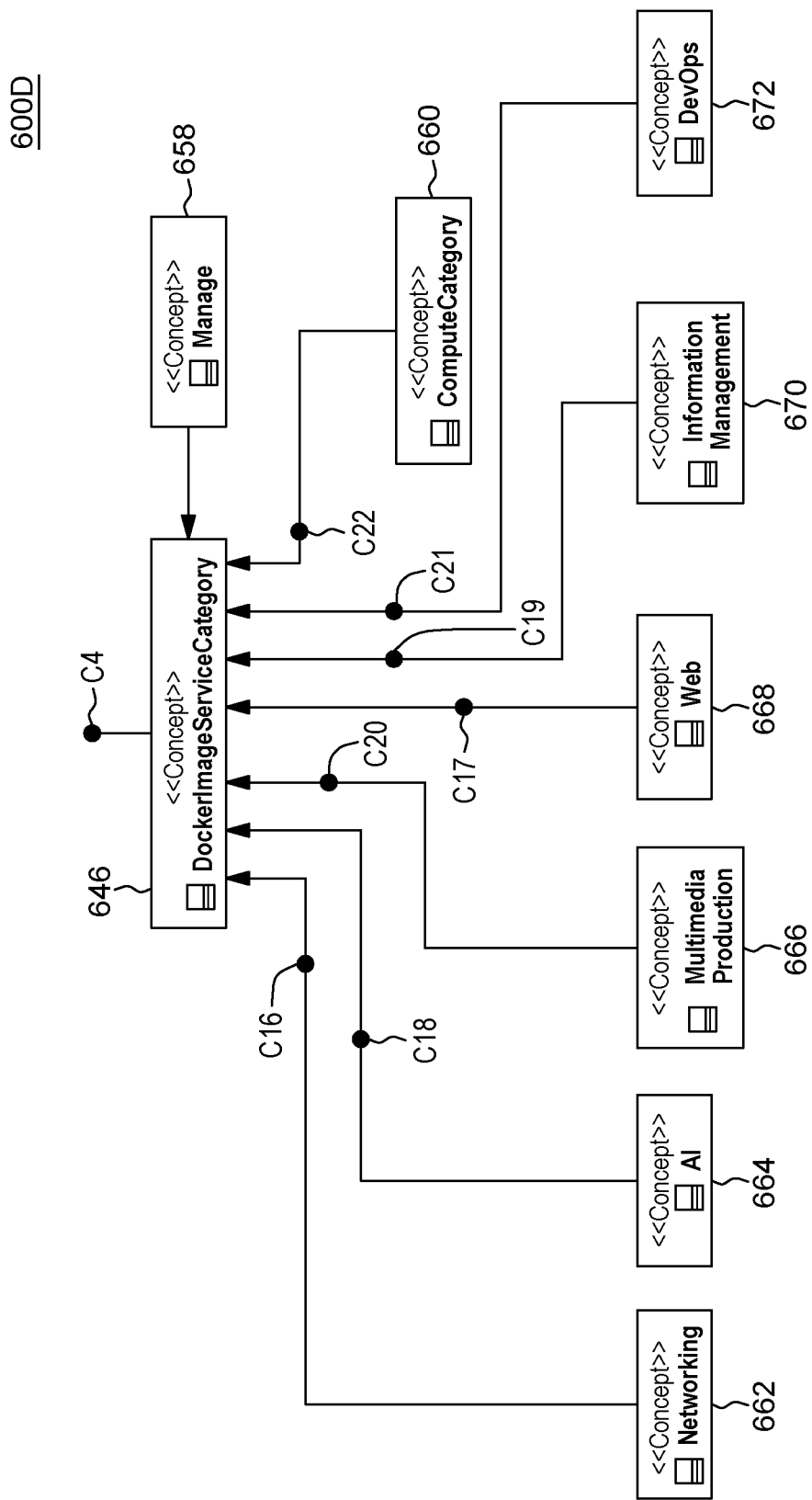

Diagram 500 of FIG. 5 shows a process to merge pre-existing ontologies using PROMPT ontology merge methodology to build OWL-DOCKER. This embodiment of OWL-DOCKER considers the usage of ontologies for Docker Container Images search, retrieve, discovery, categorization and orchestration. This embodiment of OWL-DOCKER provides for efficient search, discovery, retrieve, categorization and orchestration.

Because some embodiments of OWL-DOCKER are based on ontology technology, it has inference capability (Ontology Axioms Capability). The ontology technology upon which OWL-DOCKER is based promotes better results comparing with taxonomies, meta-models, tagging and ID Searches as documented in Service Oriented Architecture (SOA) repositories (OWL-S(Ontology Web Language for Services) and WSMO (Web Services Modeling Ontology) standards) and on Generic Cloud Computing Ontologies. Some embodiments of OWL-DOCKER define an ontology to be used at Organizational Level Docker Hub, Docker Registries and Repositories. Some embodiments of OWL-DOCKER have a big focus on Docker container images and automatic discovery. Some embodiments of OWL-DOCKER are well adapted to be used for cloud service providers because they can handle cloud layers, models and categories. Some embodiments of OWL-DOCKER formalize an ontology that can be used at Organizational Level Docker Hub, Docker Registries and Repositories. Some embodiments of OWL-DOCKER promote ontology usage into Organizational level Docker Hub Registry and Repository facilitating a capability of container search, retrieve, discovery, categorization and orchestration. Some embodiments of OWL-DOCKER also promote a mechanism to find the right Docker Image for a given project inside catalogs that list starters and services that software developers can choose to implement in web or mobile apps. Some embodiments of OWL-DOCKER will also promote a better technology alignment and integration with other tools at enterprise architecture and services levels that already supports ontologies.

Some embodiments of OWL-DOCKER can empower organizations with a more powerful Docker Registry and Repository that represents knowledge from the organization business and technology and also supports a better standardization in searching and retrieving containers and Docker container images across functional areas, promoting and integrating explicit knowledge consumption.

Some embodiments of the present invention may include one, or more, of the following features, characteristics, operations and/or advantages: (i) an ontology to be used into Docker Hub Registry and Repositories; (ii) an ontology that supports a more efficient way to search, retrieve, discovery, categorization and orchestration of Docker container images into Enterprise Level Docker Registries and Repositories; (iii) a merged ontology composed by several researches on Cloud Ontologies space; (iv) leveraging the power of ontology concepts and axioms for search and retrieve container images into Docker Images Registry and Repositories; and/or (v) an ontology based on existing research about Cloud Ontologies but specialized to Docker Images Registry and Repositories.

Some embodiments of the present invention are constructed based on the existing ontologies and researches. Some embodiments of the present invention use a methodology for ontology merge, such as ONIONS, FCA-MERGE and PROMPT. Some embodiments of the present invention that are based on the nature of the ontology merge process use PROMPT methodology because it is not based on ontology libraries construction and either is based on instance localization on domain documents. Some embodiments of the present invention evaluate and decide which aspects the ontology will inherit from pre-existing ontology schemes that are not conventionally used in the context of Docker containers and/or other types of containers.

Some embodiments of the present invention follow the four (4) steps described in the following paragraphs to create the ontology. These steps, described in the following paragraphs, are based on SABIO (systematic approach for building ontologies) methodology.

STEP ONE: Requirements Elicitation. On ontology building process, the initial step is the ontology requirements elicitation. This process in general is driven by the definition of Competency Questions. Those questions are the ones that would be used during the ontology instantiation process. Those are the issues that are typically determined on a case by case basis in designing a given embodiment of OWL-DOCKER. Competency questions drive the whole process of defining an ontology. The ontology merge process using existing Cloud Ontologies already mentioned also used those competency questions as the background to define which ontology elements should be included, excluded or merged. For example, in some embodiments the following seven (7) competency questions (note: the terms "competency issues" and "competency questions" may be used interchangeably in this document) are determined in building the ontology: (i) how one Docker container image is to be decomposed; (ii) how one Docker container image is to be categorized; (iii) what business process will uses the Docker container image; (iv) which Docker container images will have relationships with a given Docker container image; (v) which Docker container images will have similar characteristics with a given Docker container image; (vi) which business concepts a given Docker image relate to; and (vii) what Cloud Service Offerings will uses a given Docker container image.

STEP TWO: Merge of existing Cloud Ontologies and OWL-S using PROMPT Methodology. After ontology objective definition and requirements elicitation phase, the process to merge existing Cloud Ontologies and OWL-S using PROMPT methodology is started. To execute this merge process, a listing is made of all elements (Concepts, Attributes, Axioms and Relationships) of those ontologies and a merger of these elements is made, driven by the above mentioned competency questions.

STEP THREE: Add Docker Container specific elements. In this phase Docker Container research and usage is evaluated with the objective to select the elements that would support OWL-DOCKER to answer the above mentioned competency questions. The Docker images correspond to Cloud Services types, after the merge process concepts related to Cloud Services are mapped to Docker Images concepts. A fundamental part of this phase is to identify what would be the root element for OWL-DOCKER, Docker Images or Docker Containers. Docker Images with more reuse potential is a concept that is registered on Docker Registries and Docker Hub. It is defined as the central concept on this embodiment of OWL-DOCKER. This embodiment of OWL-DOCKER also incorporates Docker Container concept bringing the capability to manage Docker Image Instances (also called Docker containers). This is the concept that will have more instances. Its usage is optional for designing an embodiment of OWL-DOCKER once its major focus is on Docker Images and to maintain Docker Containers in the registry can represent a lot of effort for an element that Docker Engine already address most of its needs.

STEP FOUR: Final OWL-DOCKER. The first merge process is to incorporate Cloud Ontologies and merge with OWL-S. After this merge process, a CloudPattern concept is created related to the CloudService. Those elements can be visualized as shown in diagrams 600A to 600D (discussed in more detail below) of FIGS. 6A to 6D. This concept defines a set of templates or boilerplates to instantiate Docker Images based on a reference architecture. For example, there is a reference architecture composed by three (3) key elements: (i) HTTP Server; (ii) Application Server; and (iii) Database Server. There will be at least three (3) Docker images that will be created to instantiate this Cloud Pattern. In this embodiment, each of these Docker images corresponds to one Cloud Service Model. There are three (3) major Cloud Service Models in the market: (i) IaaS (Infrastructure as a Service); (ii) PaaS (Platform as a Service); and (iii) SaaS (Software as a Service). In this embodiment, each Docker Image is modeled as IaaS, PaaS or SaaS. Another fundamental concept to structure on this embodiment of OWL-DOCKER is the Cloud Provider. There are several Cloud Providers in the market today. Most of them offer some kind of Docker Containers capabilities. This concept is useful with respect to making OWL-DOCKER independent of vendor implementation. This technique can prevent vendor locking and dependency.

OWL-S brings a fundamental concept to OWL-DOCKER called ProcessModel. On OWL-S this concept plays a role defining the orchestration and flow between Web Services. Merging to OWL-DOCKER scenario ProcessModel concept will be mapped as BusinessProcess concept. In some embodiments of OWL-DOCKER, it is renamed on OWL-DOCKER to be adherent to Business Process Modeling (BPM) approaches and standards. BusinessProcess concept is the essential element to address the third OWL-DOCKER competency question, addressing what Business Process uses this Docker image. Through this concept it is also possible to identify which Docker images are used to implement a specific Business Process. This approach is fundamental to do impact analysis of Docker Images with Business Process at organizational level. This concept also plays a commonly used role into Business Process Monitoring.

Several Web Services ontologies like OWL-S, WSMO and OWL-SOA adopts the concept of a Domain Ontology or Domain profile associated with the target ontology. On OWL-DOCKER the DomainOnology concept brings the capability to classify or characterize Docker Images with Business concepts related to a specific domain. For example, in some embodiments of OWL-DOCKER used for banking organizations, it is important to map what Docker images are used on digital banking initiatives and what images are not. Another example is to identify what Docker images impacts the agribusiness or credit line of business. The purpose of DomainOntology concept is to provide the capability to a Docker Image to be contextualized and categorized in accordance to a specific domain where the Docker Registry and Repository using OWL-DOCKER will be used. DomainOntology concept on OWL-DOCKER can be used to answer Competency Question 6.

As an inheritance of OWL-S and WSMO, where there are Composite Services and Atomic Services OWL-DOCKER has the same approach with CompositeDockerImage and AtomicDockerImage concepts. The applicability of those concepts into OWL-DOCKER is fantastic. Into Docker and containers approach, one container image can be composed of several layers. Those layers can be other Docker Images. They are structured one in the top of the other. For example: a Docker Image with MongoDB, is composed by one Docker image at the bottom layer with Ubuntu, after another layer with a backup agent, after another one with virus scan software, and the last layer MongoDB installation. On this scenario MongoDB Docker image is composed by four (4) layers or four (4) other Docker images. One AtomicDockerImage represents an image that is not composed by other Docker Images. On the other hand, CompositeDockerImage are composed by AtomicDockerImage's or other CompositeDockerImage's combined on its layers. Most of Docker Images are instances of CompositeDockerImage concept. This tremendous reuse is one of the key benefits of Docker that can be realized with some embodiments of OWL-DOCKER.

Considering CompositeDockerImage and AtomicDockerImage concepts it is possible to address competency question 1, related to Docker Image composition and decomposition. In some embodiments, it is also fundamental to address competency question 4 related to the relationship between Docker Images. This notion is applied on impact analysis and change management approach for Docker Images versioning and evolution, where it is possible to identify what Docker Images can be impacted by a change or a new feature in one specific Docker image. AtomicDockerImage and CompositeDockerImage concepts on OWL-DOCKER answer Competency Questions 1 and 4.

Diagrams 600A, 600B, 600C, 600D of FIGS. 6A, 6B, 6C, 6D (taken collectively) show an embodiment of OWL-DOCKER UML as a final representation. The way in which the reader can assemble these four figures to visual the entire embodiment of OWL-DOCKER is established by figure connection points C1, C2, C3, C4, C5, C6, C6, C7, C8, C9, C10, C11, C12, C13, C14, C15, C16, C17, C18, C19, C20, C21 and C22. As shown in diagrams 600A, 600B, 600C, 600D, this embodiment of OWL-DOCKER UML as a final representation includes the following blocks: Concept DockerImage 602; Concept DaaS 604; Concept IaaS Concept 606; DomainOntology 608; Concept BusinessProcess 610; Concept PaaS 612; Concept ModelCloudService 614; Concept Saas 616; Concept CloudPattern 618; Concept DockerImageServiceOffering 620; Concept DockerImageServiceLevel 622; Concept Diamond 624; Concept Gold 626; Concept Silver 628; Concept Bronze 630; Concept DockerContainer 632; Concept CompositeDockerImage 634; Concept AtomicDockerImage 636; Concept NonFunctionalProperty 638; Concept RedHat 640; Concept OwnCompany 642; Concept DockerImageProvider 644; Concept DockerImageServiceCategory 646; Concept Pivotal 648; Concept IBM 650; Concept Microsoft 652; Concept AWS 654; Concept Google 656; Concept Manage 658; Concept ComputeCategory 660; Concept Networking 662; Concept AI (artificial intelligence) 664; Concept MultimediaProduction 666; Concept Web 668; Concept InformationManagement 670; and Concept DevOps 672. As shown in diagrams 600A, 600B, 600C, 600D, this embodiment of OWL-DOCKER UML as a final representation includes the following paths: isModel P1; relatedCloudPattern P2; hasCloudService P3; Imports P4; composedBy P5; is ComposedBy P6; related P7; hasServiceLevel P8; hasNonFunctionalProperties P9; offeredBy P10; classifies P11; composedOfLayers P12; and instantiatedAs P13.

Another essential dimension modeled on some embodiments of OWL-DOCKER is the Cloud Service Category. This concept is instantiated in OWL-DOCKER as a DockerImageCategory. This concept defines a set of potential categories one Docker image can be related. It creates groups of IT (information technology) domains to classify Docker images in order to realize the capability to find the best Docker image for a given application. This concept is also really helpful to identify and evaluate what are the Docker images related to a specific domain and purpose. For example, instead of looking for all Docker images with the word "Mobile" on its name, it is easier to limit the scope of the searching by navigating through a tree structure and find only Docker images for Mobile. In this example, it will also allow you to find Docker images for Mobile that eventually does not happen to have the word "Mobile" in its name. Follow FIG. 3 showing Docker Images Categories defined on this disclosure. In this embodiment, this concept addresses Competency Question 2.

Figure 7:
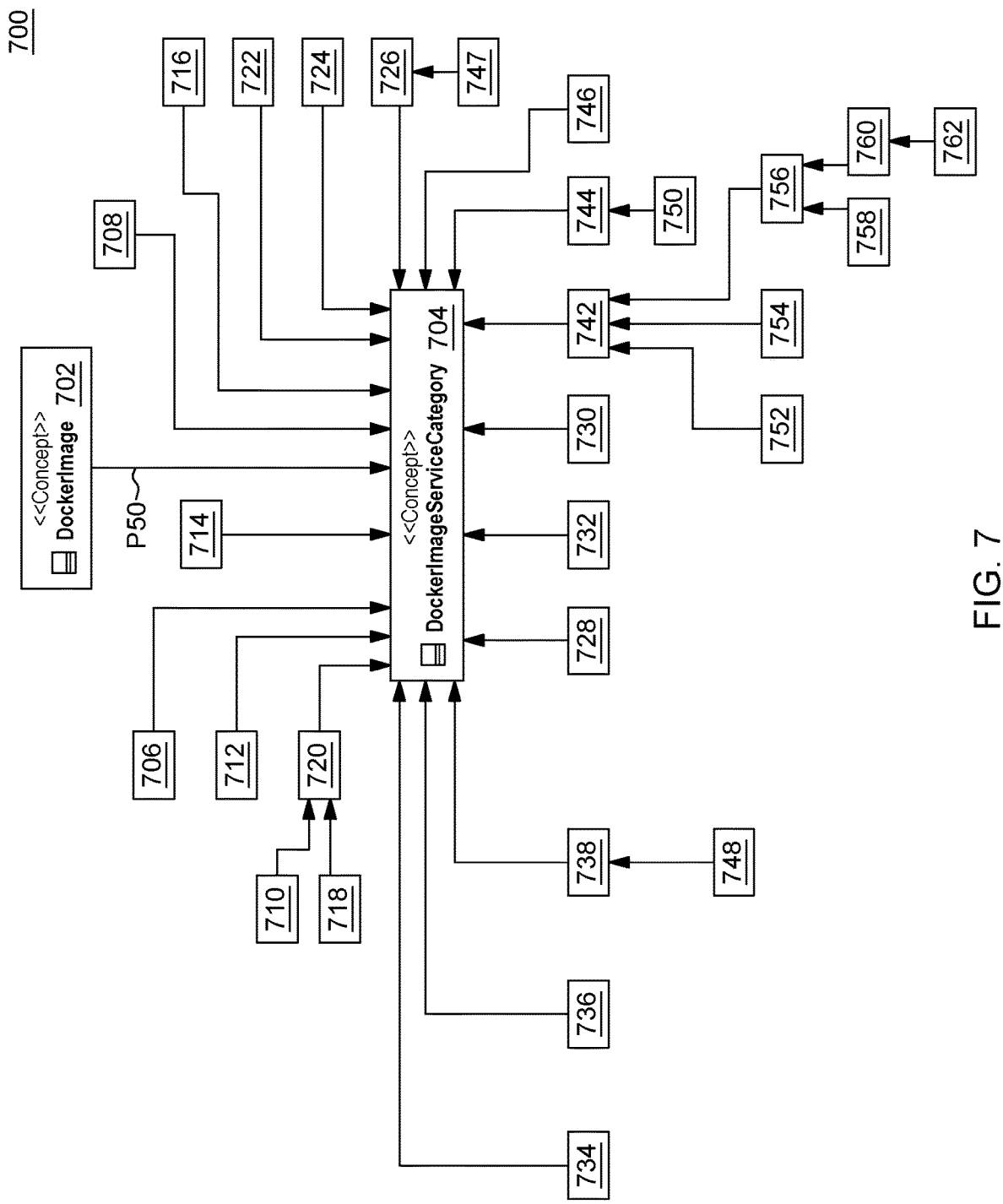
FIG. 7 is a block diagram of at least a portion of a container image ontology according to an embodiment of the present invention.

Ontology OWL-DOCKER, CloudServiceCategory concept tree Diagram 700 of FIG. 7 show an embodiment of an Ontology OWL-DOCKER, CloudServiceCategory concept tree. As shown in diagram 700, this embodiment of Ontology OWL-DOCKER, CloudServiceCategory concept tree includes the following blocks: Concept DockerImage 702 (including the following items: DockerImageName, shortDescription, fullDescription, rating, creationDate, version); Concept DockerImageServiceCategory 704; Concept IoT 706; Concept StorageCategory 708; Concept Integration 710; Concept Mobile 712; Concept Custom Category 714; Concept Cognitive 716; Concept Workflow 718; Concept Middleware 720; Concept Security 722; Concept Runtimes 724; Concept DevOps 726; Concept Networking 728; Concept Manage 730; Concept MultimediaProduction 732; Concept AI 734; Concept Web 736; Concept SystemManagement 738; Concept InformationManagement 742; Concept ComputeCategory 744; Concept Business 746; Concept SoftwareInteroperability 747; Concept Monitoring 748; Concept WorkloadDistribution 750; Concept FileStorage 752; Concept ManipulationAndAnalysis 754; Concept Database 756; Concept Massive 758; Concept NoSQL 760; and Concept KeyValue 762. As shown in diagram 700, this embodiment of Ontology OWL-DOCKER, CloudServiceCategory concept tree includes the following path: classifies P50.

Into the ModelCloudService concept, there are existing ontology schemes that incorporate an additional detail level into the IaaS (Infrastructure as a Service) concept. OWL- DOCKER contains a merge of this existing research and applies it to the Docker containers space. In the cloud space, infrastructure is commonly has three basic components as follows: compute, storage and networking. This second level detail of IaaS can be incorporated into some embodiments of OWL-DOCKER. These research also highlight a third level of specialization for compute and storage concepts. This additional level is not incorporated in some embodiments of OWL-DOCKER because of the lower relevance of this level to container images space and also because it is not related to OWL-DOCKER competency questions (as listed above).

Figure 8:
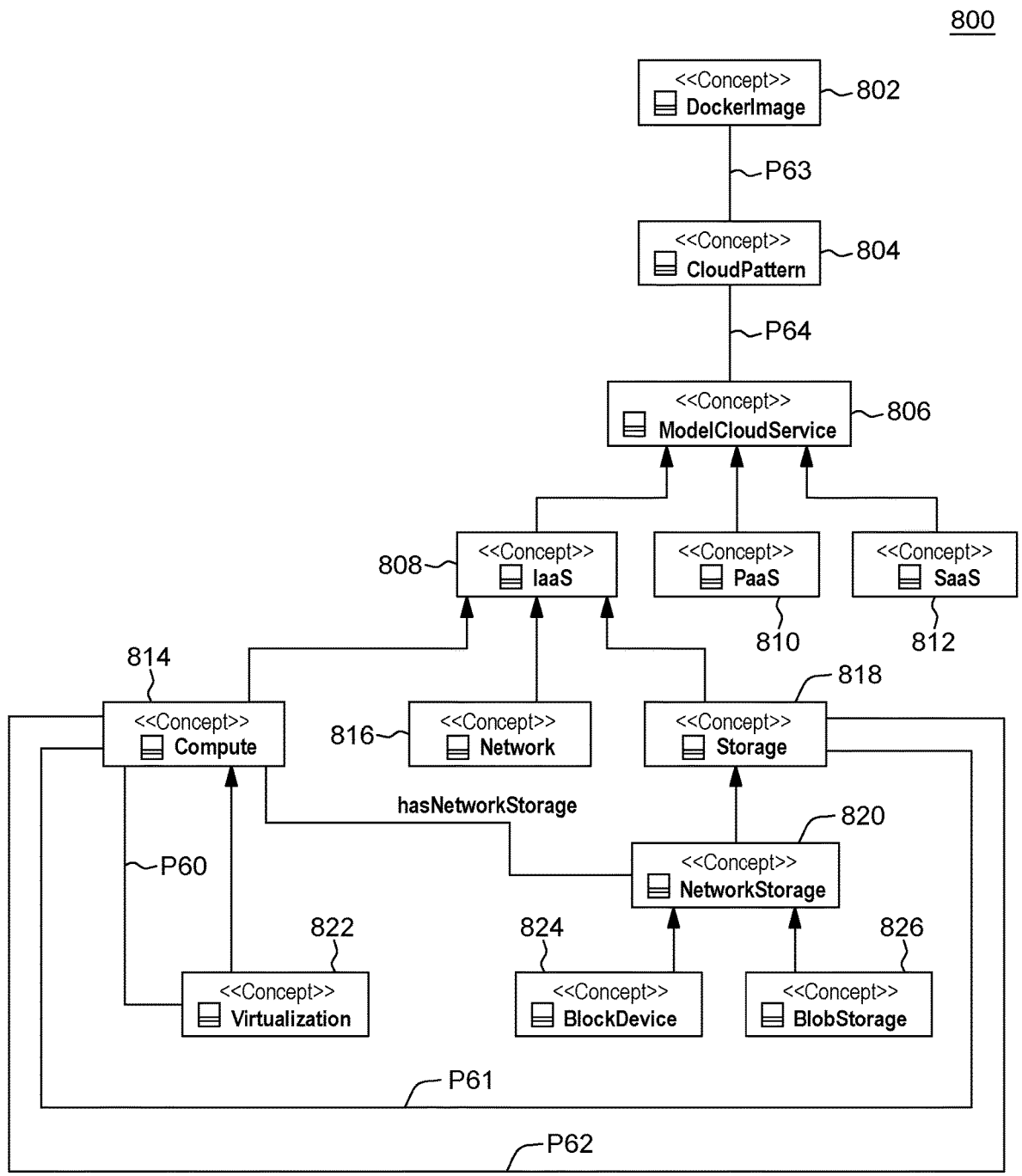
FIG. 8 is a block diagram of at least a portion of a container image ontology according to an embodiment of the present invention.

Diagram 800 of FIG. 8 shows an embodiment of an ontology OWL-DOCKER, IaaS concept tree, which includes: Concept DockerImage 802; Concept CloudPattern 804; Concept ModelCloudService 806; Concept Iaas 808; Concept PaaS 810; Concept Saas 812; Concept Compute 814; Concept Network 816; Concept Storage 818; Concept NetworkStorage 820; Concept Virtualization 822; Concept BlockDevice 824; Concept BlobStorage 826; hasVirtualization path P60; hasLocalStorage path P61; isAttachable P62; related path P63; and isModel path P64.

Incorporating elements from pre-existing ontology technology, another dimension that some embodiments of OWL-DOCKER deal with is the Cloud Service Level. Some CSPs (Cloud Service Providers) define Cloud Service Levels for their offerings. Each Service Level defines a set of capabilities and SLAs (Service Level Agreement) that are covered on that level. It also include QoS (Quality of Services) elements for Service Level definition. Some embodiments of OWL-DOCKER define that each Docker image can have a Cloud Service Level. It is not a mandatory relationship once some organizations, in special the ones that are not CSPs and create their own Docker Registries and Repositories, do not use this concept. One Docker image can have a service level of Diamond (the best QoS, Capabilities and SLAs), after in sequence Gold level, Silver and Bronze level (lower QoS, Capabilities and SLAs). CloudServiceLevel concept on OWL-DOCKER may, in some embodiments, be used to address Competency Question 7.

Some embodiments of OWL-DOCKER also incorporate another concept into the Cloud Service Model hierarchy. It is the DaaS (Desktop as a Service) concept. This concept addresses the capability of Docker images being used as remote desktop images approach. This is not the most common use case for Docker images, but there is a potential usage that some embodiments of OWL-DOCKER are prepared to support. Those Docker desktop images can be IaaS images containing Docker images as operational system, virus scan, backup agents and monitoring tools. Docker DaaS images can also be PaaS images including images with office tools like document editors, spreadsheets and so on.

A big differentiator of some embodiments of OWL-DOCKER are its axioms that add inference capability to the ontology. Table 900 of FIG. 9 show one axiom resultant of the merge process.

Another embodiment of an OWL-DOCKER axiom that was created specifically to guarantee that one Docker image has one, and only one, Cloud Service Model is shown in table 1000 of FIG. 10.

In some embodiments, to address Competency Question 5, Docker image with DockerImageServiceCategory, ModelCloudService, DomainOntology, BusinessProcess, DockerImageServiceOffering and CloudServiceProvider concepts can be used.

Figure 11:
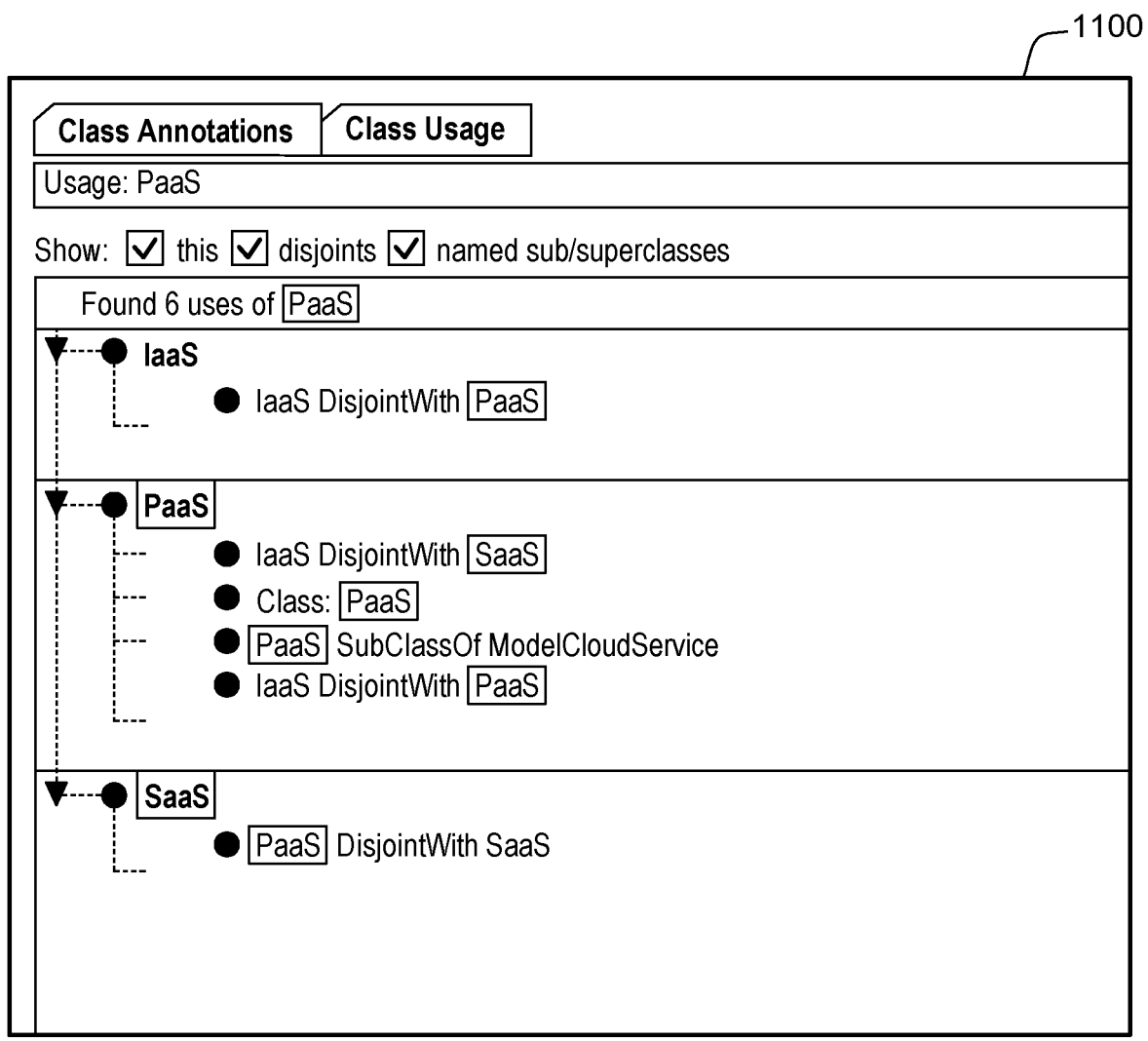
FIG. 11 is a screenshot helpful in explaining various embodiments of the present invention.

Ontology formalization will now be discussed. Once an OWL-DOCKER ontology is conceptually defined, the ontology can be formalized by using an ontology language. More specifically, it can be formalized using a formal ontology language like OWL (Ontology Web Language) as implemented by an open source tool called Protege. This tool was built and is maintained by Stanford University. Screenshot 1100 of FIG. 11 shows formalization of the axiom of table 1000 using Protege.

Usage scenarios will now be discussed. Considering OWL-DOCKER definition and formalization, there are some identified scenarios that typically one Cloud and Docker user would use OWL-DOCKER ontology on their Docker Registry and Repository as will now be discussed in the context of four (4) scenarios respectively discussed in the following four (4) paragraphs.

Scenario 1: Architect or Developer search for Docker Images inside Docker Registry and Repository that can be reused in a new business process that will be implemented.

Scenario 2: After a search operation into the Docker Image Registry and Repository, Architect/Developer found one Docker Image that can be reused on his Business Process. However, this Docker Image needs to be extended to completely address the Business Process requirements. The Architect/Developer needs to identify which Docker layers and Images this Docker Image is composed by.

Scenario 3: Given a Docker Image maintenance demand, developers need to know which are the Business Process, Docker Images and Line of Business that will be impacted by maintenance on a given Docker Image.

Scenario 4: Given a Docker Image activity, architects and testers need to find which test scenarios must be re-executed on this Docker Image after the maintenance is completed.

Figure 12:
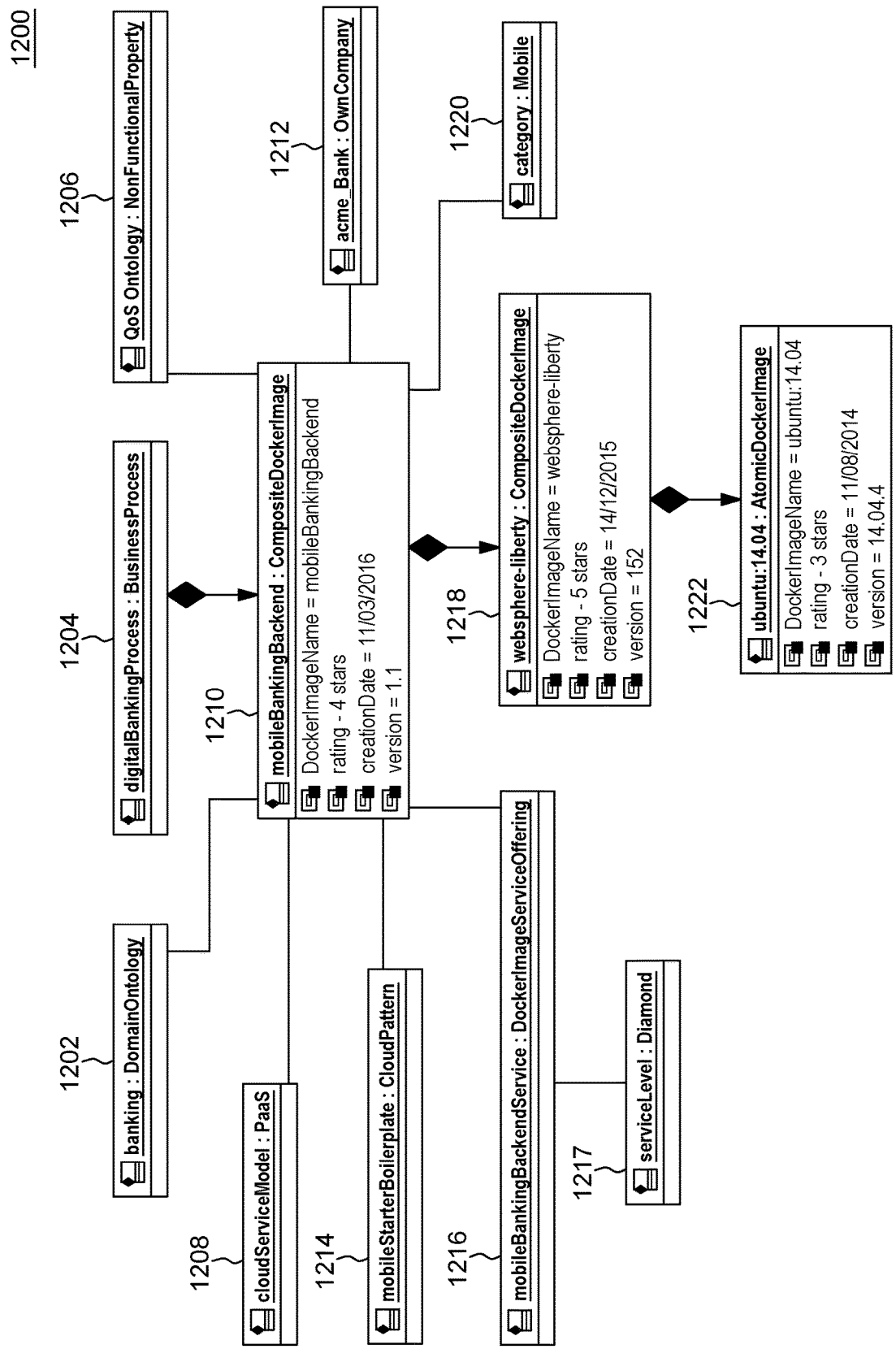
FIG. 12 is a block diagram of at least a portion of a container image ontology according to an embodiment of the present invention.

A case study of ontology instantiation will now be discussed. There is the instantiation of OWL-DOCKER Ontology considering a mobile banking backed workload, giving the members or data associated found in the Dockerhub (hub.docker.com). A selection of the results as an object diagram is shown in diagram 1200 of FIG. 12. These results allow the reading of information that can generally be found in Dockerhub and also additional concepts useful in the context of a digital banking process.

As shown, object diagram 1200 includes the following blocks: banking: DomainOntology 1202; digitalBankingProcess: BusinessProcess 1204; QoS Ontology: NonFunctionalProperty 1206; cloudServiceModel: PaaS 1208; mobileBankingBackend: CompositeDockerImage 1210; acme Bank: OwnCompany 1212; mobileStarterBoilerplate: CloudPattern 1214; mobileBankingBackendService: DockerImageServiceOffering 1216; serviceLevel: Diamond 1217; websphere-liberty: CompositeDockerImage 1218; category: Mobile 1220; and ubuntu:14.04: AtomicDockerImage 1222.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a container image ontology (CIO) data set including data indicative of a CIO that provides an organizing construct for a plurality of container images (CIs) stored in a container image repository (CIR), with the CIO including:
a plurality of container image classes,
a plurality of container image attributes,
a plurality of container image relations, and
a plurality of container image axioms;
receiving a container image search request;
searching the CIO based upon the search request and to obtain identities of a set of search-responsive CIs included in the CIO; and
returning the set of search-responsive CIs;
wherein the CIO organizes the multiple containers of the plurality of containers of the CIR so that the containers of the plurality of containers are searchable by all of the following: image class, image attributes, image relations and container image axioms.

2. The CIM of claim 1 further comprising:
instantiating a first CI of the set of search-responsive CIs to run a first container.

3. The CIM of claim 1 wherein:
the plurality of CIs are Docker container images; and
the CIO is a Docker CIO.

4. The CIM of claim 1 further comprising:
determining at least some container image classes of the plurality of container image classes of the CIO by merging them in from a pre-existing ontology data set.

5. The CIM of claim 1 further comprising:
determining at least some container image attributes of the plurality of container image attributes of the CIO by merging them in from a pre-existing ontology data set;
determining at least some container image relations of the plurality of container image relations of the CIO by merging them in from a pre-existing ontology data set; and
determining at least some container image axioms of the plurality of container image axioms of the CIO by merging them in from a pre-existing ontology data set.

6. A computer program product (CPP) comprising:
a storage medium; and
computer code stored on the storage medium, with the computer code including data and instructions for causing a processor(s) set to perform at least the following operation(s):
receiving a container image ontology (CIO) data set including data indicative of a CIO that provides an organizing construct for a plurality of container images (CIs) stored in a container image repository (CIR), with the CIO including:
a plurality of container image classes,
a plurality of container image attributes,
a plurality of container image relations, and
a plurality of container image axioms,
receiving a container image search request,
searching the CIR based upon the search request to obtain identities of a set of search-responsive CIs included in the CIO, and
returning the set of search-responsive CIs;
wherein the CIO organizes the multiple containers of the plurality of containers of the CIR so that the containers of the plurality of containers are searchable by all of the following: image class, image attributes, image relations and container image axioms.

7. The CPP of claim 6 wherein the computer code further includes instructions and data for causing the processor(s) set to perform the following operation(s):
instantiating a first CI of the set of search-responsive CIs to run a first container.

8. The CPP of claim 6 wherein:
the plurality of CIs are Docker container images; and
the CIO is a Docker CIO.

9. The CPP of claim 6 wherein the computer code further includes instructions and data for causing the processor(s) set to perform the following operation(s):
determining at least some container image classes of the plurality of container image classes of the CIO by merging them in from a pre-existing ontology data set.

10. The CPP of claim 6 wherein the computer code further includes instructions and data for causing the processor(s) set to perform the following operation(s):
determining at least some container image attributes of the plurality of container image attributes of the CIO by merging them in from a pre-existing ontology data set;
determining at least some container image relations of the plurality of container image relations of the CIO by merging them in from a pre-existing ontology data set; and
determining at least some container image axioms of the plurality of container image axioms of the CIO by merging them in from a pre-existing ontology data set.

11. A computer system (CS) comprising:
a processor(s) set;
a storage medium; and
computer code stored on the storage medium, with the computer code including data and instructions for causing the processor(s) set to perform at least the following operation(s):
receiving a container image ontology (CIO) data set including data indicative of a CIO that provides an organizing construct for a plurality of container images (CIs) stored in a container image repository (CIR), with the CIO including:

a plurality of container image classes,
a plurality of container image attribute of s,
a plurality of container image relations, and
a plurality of container image axioms,
receiving a container image search request,
searching the CIR based upon the search request to obtain identities of a set of search-responsive CIs included in the CIO, and
returning the set of search-responsive CIs;
wherein the CIO organizes the multiple containers of the plurality of containers of the CIR so that the containers of the plurality of containers are searchable by all of the following: image class, image attributes, image relations and container image axioms.

12. The CS of claim 11 wherein the computer code further includes instructions and data for causing the processor(s) set to perform the following operation(s):
instantiating a first CI of the set of search-responsive CIs to run a first container.

13. The CS of claim 11 wherein:
the plurality of CIs are Docker container images; and
the CIO is a Docker CIO.

14. The CS of claim 11 wherein the computer code further includes instructions and data for causing the processor(s) set to perform the following operation(s):
determining at least some container image classes of the plurality of container image classes of the CIO by merging them in from a pre-existing ontology data set;
determining at least some container image relations of the plurality of container image relations of the CIO by merging them in from a pre-existing ontology data set; and
determining at least some container image axioms of the plurality of container image axioms of the CIO by merging them in from a pre-existing ontology data set.

* * * * *